(12) United States Patent
Idaka

(10) Patent No.: US 10,186,122 B2
(45) Date of Patent: Jan. 22, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yujiro Idaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/098,206

(22) Filed: Apr. 13, 2016

(65) Prior Publication Data

US 2016/0314665 A1 Oct. 27, 2016

(30) Foreign Application Priority Data

Apr. 23, 2015 (JP) ................................. 2015-088797

(51) Int. Cl.
*G06K 9/00* (2006.01)
*G08B 13/196* (2006.01)
*G06T 3/00* (2006.01)

(52) U.S. Cl.
CPC ...... *G08B 13/19602* (2013.01); *G06T 3/0018* (2013.01)

(58) Field of Classification Search
CPC .................................................. G06T 3/0018
See application file for complete search history.

(56) References Cited

U.S. PATENT DOCUMENTS

| 2011/0043667 A1* | 2/2011 | Kotani | H04N 5/23216 348/241 |
| 2011/0109774 A1* | 5/2011 | Onomura | G06T 3/0062 348/241 |
| 2011/0249153 A1* | 10/2011 | Hirooka | B60R 1/00 348/241 |
| 2013/0258047 A1* | 10/2013 | Morimoto | H04N 5/23267 348/36 |
| 2015/0178903 A1* | 6/2015 | Maeno | G06T 5/006 382/275 |
| 2017/0041538 A1* | 2/2017 | Choi | G06T 3/0062 |

FOREIGN PATENT DOCUMENTS

| JP | 08-123935 A | 5/1996 |
| JP | 2013-27021 A | 2/2013 |

* cited by examiner

*Primary Examiner* — Oneal R Mistry
(74) *Attorney, Agent, or Firm* — Canon U.S.A., Inc. I.P. Division

(57) ABSTRACT

In an information processing apparatus, a conversion unit converts position information indicated by a line or a figure set onto a corrected captured image generated through distortion correction processing executed on at least a part of a captured image captured by an image capturing apparatus into position information in the captured image by at least using information relating to a condition for executing analysis processing for analyzing the captured image. A control unit controls an analysis unit to execute the analysis processing using the position information converted by the conversion unit.

7 Claims, 13 Drawing Sheets

FIG.7

| ITEM | CONSTRAINT MATTERS |
|---|---|
| TYPE OF DETECTION LINE | BROKEN LINE |
| MAXIMUM NUMBER OF LINES | 10 LINES |

| REGION | NUMBER OF DETECTION REGION FRAMES |
|---|---|
| HIGH RESOLUTION | LARGE |
| LOW RESOLUTION | SMALL |

| | RESOLUTION | REGION | NUMBER OF DETECTION REGION FRAMES |
|---|---|---|---|
| 901 | HIGH | 1201 | LARGE |
| | LOW | 1202 | SMALL |
| | ... | ... | ... |

INFORMATION PROCESSING APPARATUS, INFORMATION PROCESSING METHOD, AND STORAGE MEDIUM

BACKGROUND OF THE INVENTION

Field of the Invention

The present disclosure relates to a technique for executing a setting of image analysis on a captured image.

Description of the Related Art

Conventionally, there has been known a technique for detecting a moving object that passes over a passage detection line set onto a screen for displaying a video image from the video image.

In a case where a wide-angle lens is used for an optical system of an image capturing apparatus, there may be a case where a straight line in a real space is displayed as a curved line on a screen because of distortion arising in a peripheral portion of a video image. Therefore, Japanese Patent Application Laid-Open No. 08-123935 discusses a technique for using a curved line that is adjusted in accordance with distortion of an image as a passage detection line.

Further, Japanese Patent Application Laid-Open No. 2013-27021 discusses an image processing apparatus capable of generating a panoramic image by correcting distortion of a captured image captured by an image capturing apparatus.

However, with respect to the technique described in Japanese Patent Application Laid-Open No. 08-123935, it is problematic for a user to adjust and set a curved line onto a captured image in accordance with the distortion of the image.

Accordingly, through the image processing apparatus described in Japanese Patent Application Laid-Open No. 2013-27021, a corrected image may be generated from a captured image by correcting distortion thereof, and a figure such as a passage detection line is set onto the corrected image in order to reduce the problematic operation.

However, in the conventional technique, disparity between a figure settable onto a captured image by the image capturing apparatus and a figure settable onto a corrected image by the image processing apparatus that executes distortion correction processing is not taken into consideration. Accordingly, even if the user sets a figure on the corrected image through the image processing apparatus, the image capturing apparatus may not be able to set the figure onto the captured image.

SUMMARY OF THE INVENTION

According to an exemplary embodiment of the present disclosure, an image processing apparatus includes the following configurations.

An information processing apparatus includes a conversion unit configured to convert position information, indicated by a line or a figure set onto a corrected captured image generated through distortion correction processing executed on at least a part of a captured image captured by an image capturing apparatus, into position information in the captured image by at least using information relating to a condition for executing analysis processing for analyzing the captured image, and a control unit configured to control an analysis unit to execute the analysis processing using the position information converted by the conversion unit.

According to other aspects of the present disclosure, one or more additional information processing apparatuses, one or more information processing methods and one or more mediums are discussed herein. Further features of the present disclosure will become apparent from the following description of exemplary embodiments with reference to the attached drawings.

BRIEF DESCRIPTION OF THE DRAWINGS

FIG. 7 is a table illustrating an example of constraint information indicating a figure settable by the image capturing apparatus.

FIG. 8 is a table illustrating a number of detection region frames settable at each region in a captured image.

FIG. 9 is a table illustrating a number of detection region frames settable at each region in a captured image.

DESCRIPTION OF THE EMBODIMENTS

An exemplary embodiment of the present disclosure will be described in detail with reference to the appended drawings. The present disclosure is not limited to the below-described exemplary embodiments, and various modifications and changes are possible within the gist of the present disclosure.

Figure 13:
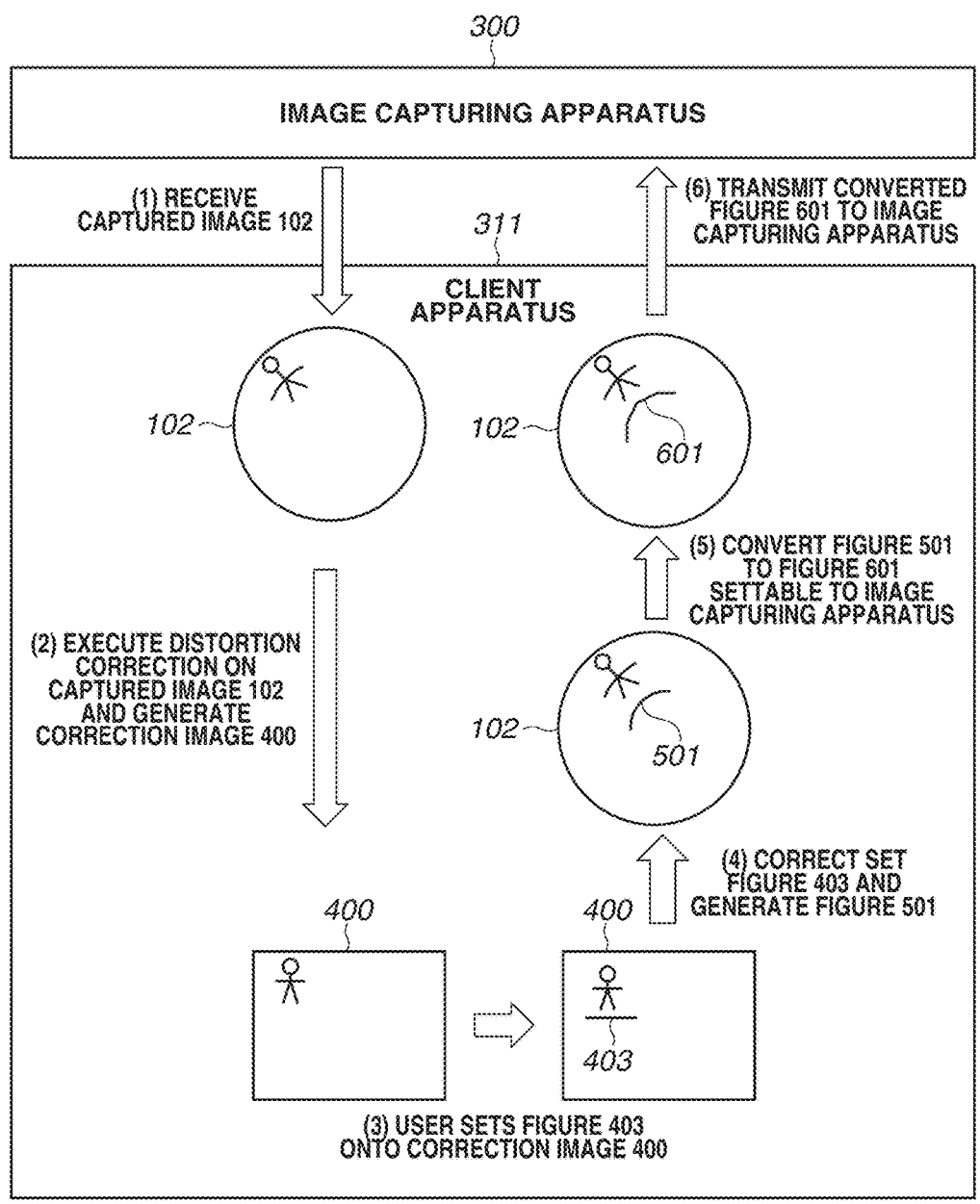
FIG. 13 is a diagram schematically illustrating processing executed by the image processing system according to the first and the second exemplary embodiments.

A general configuration of an image processing system according to a first exemplary embodiment will be described with reference to FIG. 13. Description will be given to a configuration in which an image capturing apparatus 300 is connected to a client apparatus 311 via a network. The image processing system according to the present exemplary embodiment converts a first figure 403 input by a user into a second figure 601 settable to the image capturing apparatus 300 and sets the second figure 601 to the image capturing apparatus 300 as a figure that is to be used for predetermined image analysis executed by the image capturing apparatus 300.

First, the image capturing apparatus 300 captures a captured image 102 and transmits the captured image 102 to the client apparatus 311. The client apparatus 311 executes distortion correction on all or a part of the received captured image 102 and generates a corrected image (corrected captured image) 400. The client apparatus 311 displays the generated corrected image 400 on a display unit 326 described below, and allows a user to set a figure 403 onto the corrected image 400. For example, the figure 403 set thereto may be a passage detection line for detecting whether a moving object has passed over a straight line. Next, the client apparatus 311 distorts the figure 403 input by the user according to the captured image 102 on which distortion correction has not been corrected, and generates a figure 501. For example, the figure 501 is a curved line generated in such a manner that a straight line corresponding to the figure 403 is corrected according to distortion aberration of an image capturing unit of the image capturing apparatus 300. Herein, description will be given to the image capturing apparatus 300 that cannot execute image analysis by using a curved line but can execute the image analysis by using only a straight line. Because the image capturing apparatus 300 cannot use the corrected figure 501 for the image analysis as it is, the client apparatus 311 converts the figure 501 into a figure 601 that is usable for the image analysis by the image capturing apparatus 300. Then, the client apparatus 311 instructs the image capturing apparatus 300 to execute image analysis by using the converted figure 601. The converted figure 601 is expressed with a plurality of line segments to approximate to the curvilinear figure 501. As described above, the first figure 403 input by the user is converted to the second figure 601 settable to the image capturing apparatus 300, so as to be capable of being set to the image capturing apparatus 300. Through the above processing, the client apparatus 311 can instruct the image capturing apparatus 300 to detect a moving object passing over the figure 601 set onto the captured image 102. Because the figure is automatically converted by the client apparatus 311, the user can easily execute the setting of the image analysis on the image capturing apparatus 300 without considering contents of the image analysis settable to the image capturing apparatus 300.

A configuration of the image processing system according to the present exemplary embodiment will be described with reference to FIG. 3A.

Figure 3A:
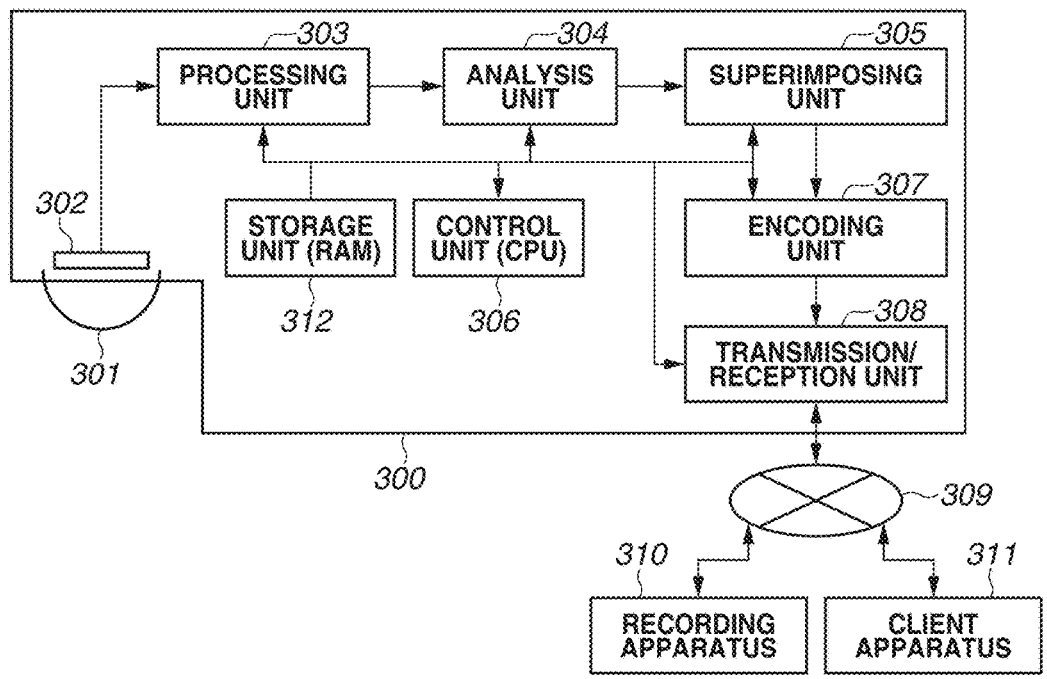
FIGS. 3A and 3B are block diagrams illustrating a configuration of an image processing system according to a first exemplary embodiment.

In the image processing system illustrated in FIG. 3A, the image capturing apparatus 300, a recording apparatus 310, and the client apparatus 311 are connected to each other via a network 309.

The image capturing apparatus 300 captures a video image including a plurality of captured images. The image capturing apparatus 300 according to the present exemplary embodiment executes image analysis on the captured video image.

For example, the image capturing apparatus 300 executes moving object detection processing for detecting a moving object from a captured video image. The image capturing apparatus 300 can execute moving object detection processing in which moving object detection is executed in a region inside of a circular or a polygonal figure set onto a captured image while the moving object detection is not executed in a region outside of that figure.

Further, the image capturing apparatus 300 according to the present exemplary embodiment executes passage detection processing for detecting an object that has passed over a line set onto the captured image. The image capturing apparatus 300 may execute intrusion detection processing for detecting a moving object intruding into the inside of a circular or a polygonal figure set onto the captured image from the outside thereof. Furthermore, the image capturing apparatus 300 may execute counting processing for counting a number of objects passing over a line, a circumference of a circular figure, or a side of a polygonal figure set thereto. The image capturing apparatus 300 may execute one or more pieces of optional processing from among the above-described plurality of pieces of processing.

The image analysis executed by the image capturing apparatus 300 is not limited to the moving object detection processing or the passage detection processing. For example, image analysis such as abandonment detection for detecting an object that is motionless even if a predetermined time has elapsed since the object has appeared in a specified region or carrying-away detection for detecting that an object is carried away from a specified region may be executed thereby. Further, image analysis such as mischief detection for detecting that a lens of the image capturing apparatus 300 is covered by a shielding object or sprayed with foreign matter may be executed. With respect to the mischief detection, for example, occurrence of the mischief can be detected in a case where a predetermined time has elapsed since a region of a predetermined size within a specified region is changed. For example, the user can specify the above region by setting a figure such as a rectangular frame that represents a specified region onto a captured image.

The recording apparatus 310 records a captured image received from the image capturing apparatus 300 via the network 309.

The client apparatus 311 is an image processing apparatus that instructs the image capturing apparatus 300 to execute image analysis such as the moving object detection or the passage detection. The user can set a figure used for the image analysis executed by the image capturing apparatus 300 to the image capturing apparatus 300 via the client apparatus 311. For example, the figure used for the image analysis executed by the image capturing apparatus 300 includes a passage detection line used for the passage detection executed by the image capturing apparatus 300. Further, the figure used for the image analysis executed by the image capturing apparatus 300 includes a circle or a polygon for specifying a region in the captured image where the image capturing apparatus 300 executes the moving object detection, the carrying-away detection, the abandonment detection, or the mischief detection.

For example, the network 309 can be configured of the internet, a wired local area network (LAN), a wireless LAN, a wide area network (WAN), or an analog cable. The network 309 is configured of a plurality of routers, switches, and cables, while a communication standard, a scale, and a configuration thereof are not taken into consideration. For example, Ethernet® may be used as a communication standard of the LAN.

Subsequently, a configuration of the image capturing apparatus 300 will be described.

A lens 301 forms an image on an image sensor 302. In the present exemplary embodiment, a wide-angle lens is used as the lens 301. For example, the lens 301 may be an omnidirectional lens capable of capturing an image in a range of 360 degrees by making an axis orthogonal to an installation face of the image capturing apparatus 300 as a center.

The image sensor 302 converts an image formed thereon into an electric signal to transmit it to a processing unit 303. An image sensor such as a complementary metal-oxide semiconductor (CMOS) sensor or a charge coupled device (CCD) sensor can be used as the image sensor 302. The lens 301 and the image sensor 302 constitute an image capturing unit of the image capturing apparatus 300.

The processing unit 303 executes image processing such as color complementation processing and gamma correction processing on the image transmitted from the image sensor 302, and transmits the processed image to an analysis unit 304.

The analysis unit 304 analyzes the image transmitted from the processing unit 303. The analysis unit 304 executes image analysis based on the setting instructed from the client apparatus 311. The analysis unit 304 uses a figure set onto the captured image by a control unit 306 to execute image analysis. For example, the analysis unit 304 uses a line set onto the captured image to execute passage detection processing for detecting an object passing over the line. The image analysis includes, for example, at least any one of the above-described passage detection processing, the moving object detection processing, the intrusion detection processing, and the counting processing.

A superimposing unit 305 superimposes a mask image onto the captured image. With this processing, a part of the regions in the captured image will not be displayed at the client apparatus 311.

An encoding unit 307 executes encoding processing of the captured image. A coding method such as a Joint Photographic Experts Group (JPEG) method may be used. Alternatively, a coding method such as an H.264/Moving Picture Experts Group Phase 4 Advanced Visual Communication (MPEG-4 AVC) method may be used. In addition, a coding method such as a High Efficiency Video Coding (HEVC) method may be used. However, the coding method is not limited to the above. Further, the encoding unit 307 may execute the encoding processing by selecting a coding method from a plurality of coding methods.

A transmission/reception unit 308 transmits the captured image encoded by the encoding unit 307 to the recording apparatus 310 and the client apparatus 311 via the network 309.

Further, the transmission/reception unit 308 receives a setting instruction from the client apparatus 311. The received setting instruction is output to the control unit 306. The setting instruction includes an instruction for setting a figure used for the analysis processing executed by the analysis unit 304 onto the captured image. For example, the instruction transmitted from the client apparatus 311 includes an instruction (i.e., position information) for specifying a number of passage detection lines used for executing the above-described passage detection processing or a position thereof in the captured image.

The control unit 306 controls operations of the constituent elements of the image capturing apparatus 300. The control unit 306 analyzes the setting instruction received by the transmission/reception unit 308 and makes the analysis unit 304 execute the image analysis instructed from the client apparatus 311. For example, a processor such as a central processing unit (CPU) may be used as the control unit 306.

A storage unit 312 stores various setting values and data of the image capturing apparatus 300. In a case where the control unit 306 is configured of a processor, the storage unit 312 stores a program executed by the control unit 306. For example, a memory such as a random access memory (RAM) or a read only memory (ROM) may be used as the storage unit 312. Alternatively, a storage medium such as a hard disk drive (HDD) may be used therefor. Further, the storage unit 312 may be a removable medium such as a flash memory or a memory card.

Figure 3B:
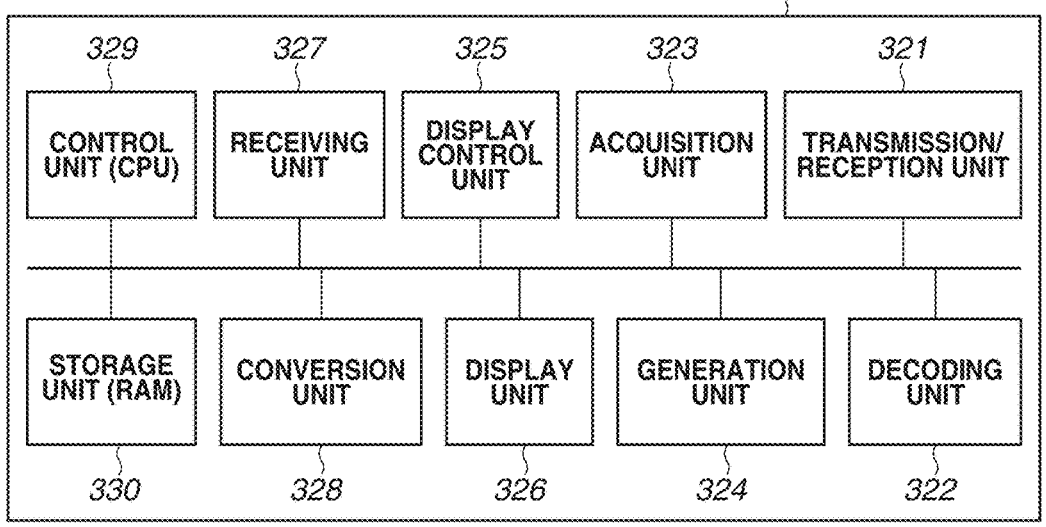

Subsequently, a configuration of the client apparatus 311 will be described with reference to FIG. 3B.

Figure 2:
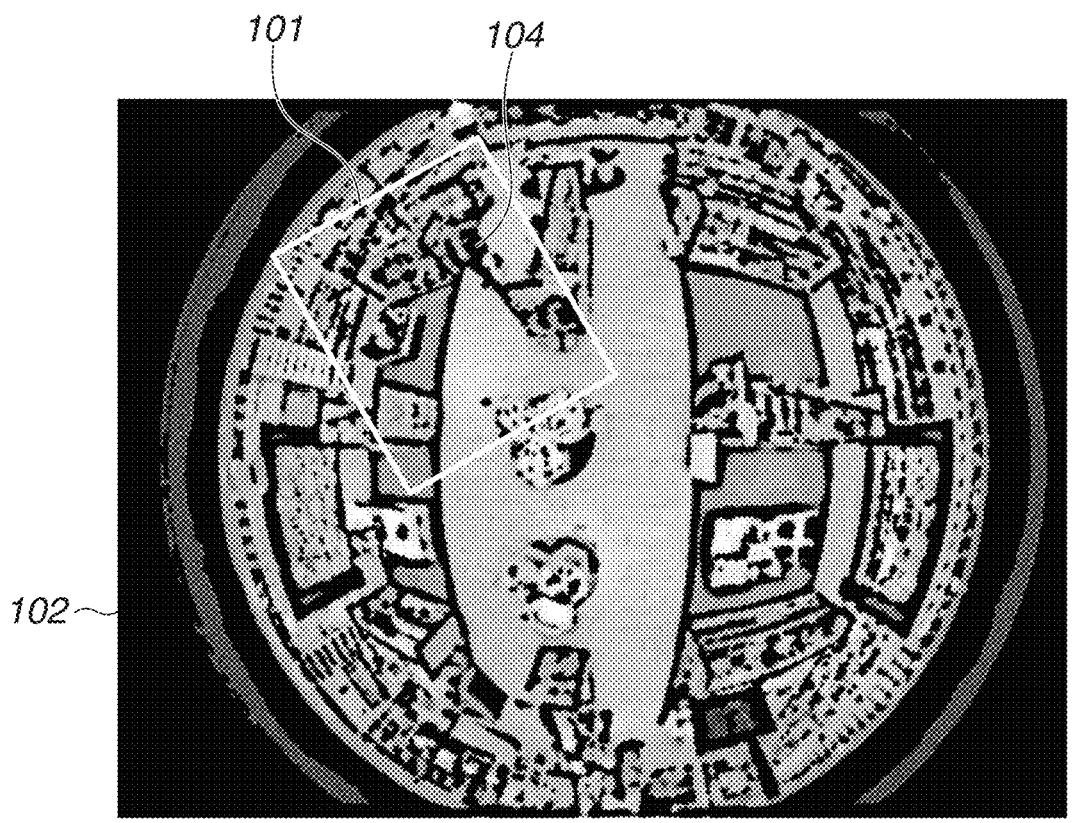
FIG. 2 is a diagram illustrating an example of a captured image captured by an image capturing apparatus.

A transmission/reception unit 321 receives the captured image captured by the image capturing apparatus 300. For example, the transmission/reception unit 321 receives a circular-shape captured image 102 illustrated in FIG. 2 from the image capturing apparatus 300. Further, the transmission/reception unit 321 transmits a setting instruction of image analysis to the image capturing apparatus 300. The transmission/reception unit 321 transmits an instruction for setting a figure onto the captured image 102 and executing image analysis of the captured image 102 based on the figure set onto the captured image 102 to the image capturing apparatus 300.

A decoding unit 322 decodes the captured image 102 received by the transmission/reception unit 321.

An acquisition unit 323 acquires, from the image capturing apparatus 300, information indicating a figure settable onto the captured image 102 by the analysis unit 304 of the image capturing apparatus 300. For example, as illustrated in a table 701 of FIG. 7, the information indicating a figure settable onto the captured image 102 by the image capturing apparatus 300 may be a type of usable figure (e.g., a broken line, a straight line, or a curved line) or a number of straight lines settable at a time with respect to the passage detection processing. The information may indicate not only the straight lines but also any information that enables a figure of a predetermined type to be set onto the captured image 102. Further, for example, the information indicating a figure settable onto the captured image 102 by the image capturing apparatus 300 may be a type of figure (e.g., a circle, an ellipse, or a polygon) or a maximum number of vertexes of the polygon usable for specifying a region in the captured image 102 where the moving object detection is to be executed. Furthermore, for example, the information indicating a figure settable onto the captured image 102 by the image capturing apparatus 300 may be a type of figure or a maximum number of vertexes thereof usable for specifying a region in the captured image 102 for which a detection event is to be output in a case where intrusion of an object is detected through the intrusion detection. The above-described pieces of information are examples of information relating to a condition for executing analysis processing.

The table 701 illustrated in FIG. 7 may be provided at each type of detection processing. For example, in addition to the table 701 for the passage detection processing illustrated in FIG. 7, a table indicating a type of figure or a maximum number of vertexes of the figure settable for the intrusion detection by the image capturing apparatus 300 may be provided separately.

The acquisition unit 323 may request the image capturing apparatus 300 for only the information (i.e., table) corresponding to the type of detection processing set by the client apparatus 311. For example, when an information acquisition request is transmitted, information indicating a type of detection processing is notified to the image capturing apparatus 300, so that the acquisition unit 323 can acquire information of a figure that is settable by the image capturing apparatus 300 for the detection processing of a notified type.

An acquisition timing of the above-described information is not specified in particular. For example, the client apparatus 311 may transmit the above information acquisition request to the image capturing apparatus 300 at a timing when the client apparatus 311 is connected to the image capturing apparatus 300.

Alternatively, the information acquisition request may be transmitted every time the client apparatus 311 starts executing detection setting. For example, at a timing when a setting tool for executing the detection setting is activated in the client apparatus 311, the client apparatus 311 may send a transmission request for information indicating a figure settable by the image capturing apparatus 300. The setting tool can be activated when a control unit 329 described below reads and executes a program stored in a storage unit 330 described below.

In a case where the information acquisition request is transmitted at a timing when the client apparatus 311 is connected to the image capturing apparatus 300, a number of times of information acquisition processing can be reduced in comparison to the case where the information acquisition request is transmitted every time the setting tool is activated. Further, a time taken to make the setting processing executable after activating the setting tool can be shortened.

On the other hand, for example, a method in which the information acquisition request is transmitted every time the setting tool is activated is beneficial when a plurality of image capturing apparatuses 300 is connected to a single client apparatus 311. When the setting tool is activated, the user specifies as to which image capturing apparatus 300 from among a plurality of image capturing apparatuses 300 the setting processing is to be executed. The client apparatus 311 transmits an acquisition request for information indicating a figure settable onto the captured image 102 to the image capturing apparatus 300 specified by the user. Through the above-described method, the information acquisition request can be transmitted to only an image capturing apparatus 300 where the detection setting is executed from among a plurality of image capturing apparatuses 300 connected to the client apparatus 311. Accordingly, detection setting processing can be executed without executing processing for transmitting the information acquisition request to all of image capturing apparatuses 300 connected to the client apparatus 311.

A generation unit 324 executes distortion correction processing on at least a part of the captured image 102 that is received from the image capturing apparatus 300 and decoded by the decoding unit 322, and generates a corrected image. For example, the generation unit 324 corrects a part of the circular-shape captured image 102 illustrated in FIG. 2 received by the transmission/reception unit 321 and generates a corrected image 400 illustrated in FIG. 4. For example, of the captured image 102 in FIG. 2 displayed on a display unit 326 described below, the generation unit 324 can generate the corrected image 400 of a partial region 101 specified by the user. Because the correction processing is executed on only the partial region 101 in the captured image 102, a processing load for executing the correction processing can be reduced. Naturally, the corrected image 400 illustrating an entire portion of the captured image 102 may be generated by correcting the entire portion of the captured image 102.

A display control unit 325 displays the captured image 102 received from the image capturing apparatus 300 on the display unit 326. Further, the display control unit 325 displays the corrected image 400 generated by the generation unit 324 on the display unit 326. The captured image 102 and the corrected image 400 can be displayed on a single screen in juxtaposition. Furthermore, the captured image 102 and the corrected image 400 may be switched and displayed on the display unit 326. Alternatively, in a case where the corrected image 400 of only a part of the captured image 102 is to be generated, the corrected image 400 may be displayed and superimposed onto the region 101 corresponding to the corrected image 400 in the captured image 102. The display unit 326 may be disposed on an exterior portion of the client apparatus 311.

Figure 4:
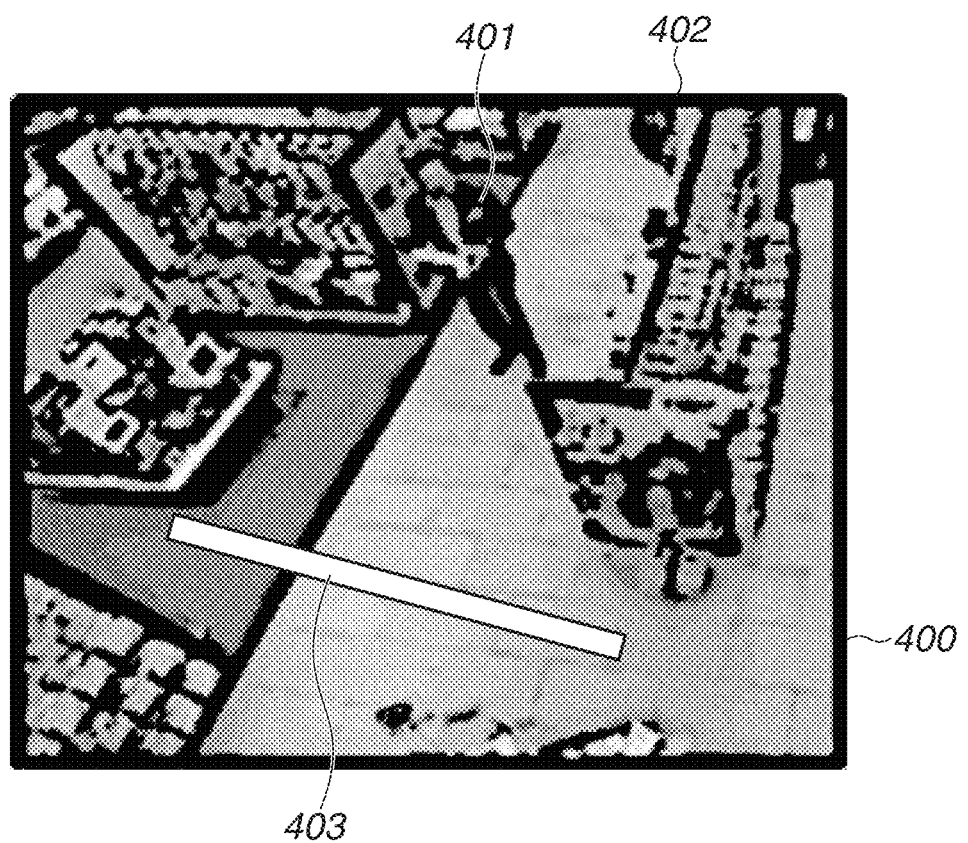
FIG. 4 is a diagram illustrating an image generated from a captured image by correcting a part of regions thereof.

A receiving unit 327 receives an instruction for setting a figure onto the corrected image 400. For example, as illustrated in FIG. 4, the receiving unit 327 receives an instruction for setting a figure 403 onto the corrected image 400. In the example illustrated in FIG. 4, the figure 403 is a straight line.

A conversion unit 328 uses the information acquired by the acquisition unit 323 to convert a first figure set onto the corrected image 400 into a second figure settable onto the captured image 102 by the image capturing apparatus 300. For example, the conversion unit 328 converts the figure 403 illustrated in FIG. 4 into a figure 601 consisting of a plurality of straight lines illustrated in FIG. 6.

The conversion unit 328 corrects a figure corresponding to the figure 403 to be displayed on the position in the captured image 102 corresponding to the position of the figure 403 in the corrected image 400. The conversion unit 328 corrects a shape of the figure 403 in the corrected image 400 based on distortion aberration of the lens 301. For example, when the figure 403 expressed as a straight line in the corrected image 400 is converted and placed at a corresponding position in the captured image 102, the figure 403 is expressed as an arc-like figure 501 illustrated in FIG. 5. As described above, the conversion unit 328 converts a position (position information) indicated by a line or a figure set onto the corrected image 400 into a position (position information) in the captured image 102.

Further, the conversion unit 328 uses the information which the acquisition unit 323 acquires from the image capturing apparatus 300 to execute conversion. The information acquired from the image capturing apparatus 300 indicates a figure settable onto the captured image 102, and includes the information, for example, illustrated in FIG. 7.

As illustrated in FIG. 7, there may be a case where the image capturing apparatus 300 cannot set a curved line onto the captured image 102 as a figure used for the passage detection processing, but can set only a broken line consisting of straight lines of ten or less. In such a case, the conversion unit 328 further converts the arc-like figure 501 illustrated in FIG. 5 into a figure 601 consisting of straight lines of ten or less as illustrated in FIG. 6. As described above, the conversion unit 328 at least uses the information relating to a condition for executing analysis processing to convert the position (position information) indicated by a line or a figure set onto the corrected image 400 into the position (position information) in the captured image 102.

Figure 5:
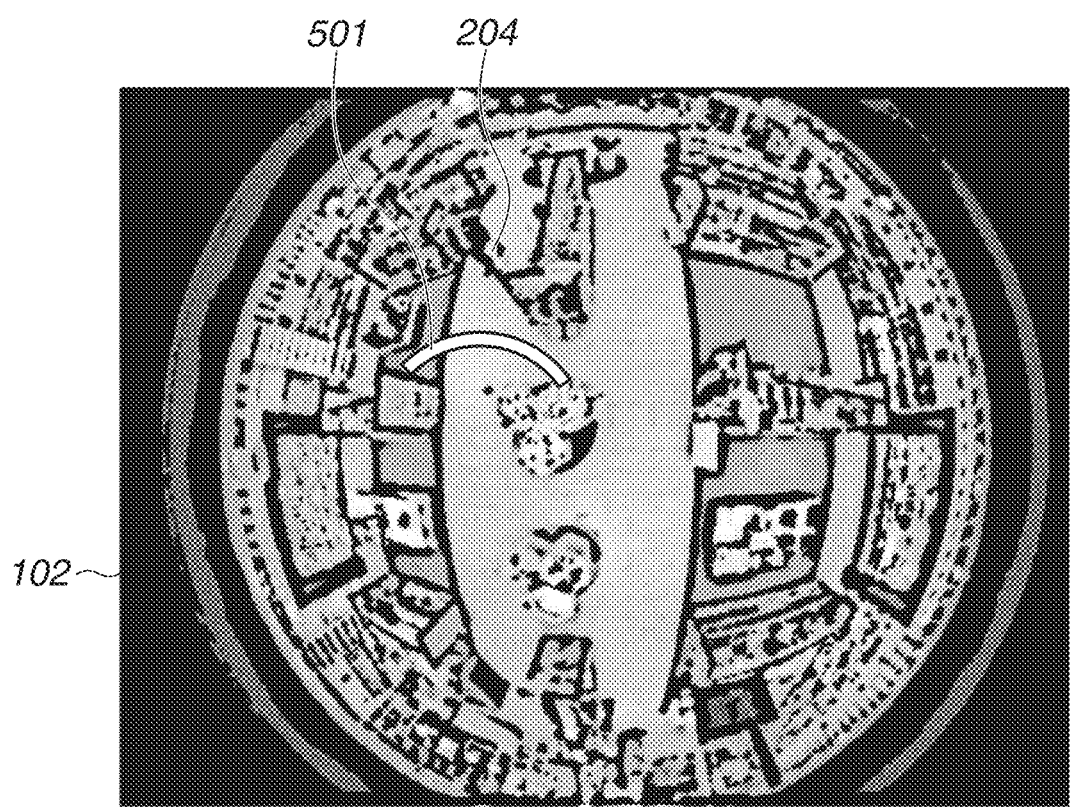
FIG. 5 is a diagram illustrating a passage detection line corrected according to distortion of a captured image.
Figure 6:
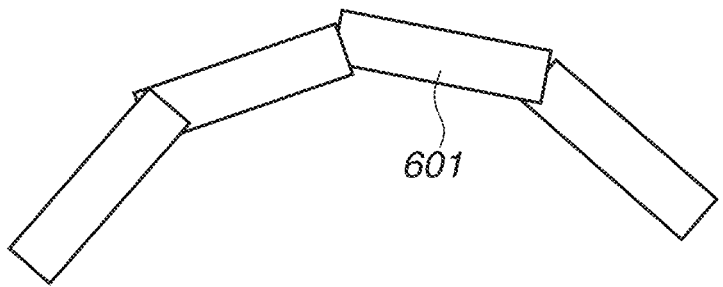
FIG. 6 is a diagram illustrating a plurality of converted lines settable to the image capturing apparatus.

Although the image capturing apparatus 300 cannot use the figure 501 illustrated in FIG. 5 for the passage detection processing as it is, the image capturing apparatus 300 can execute the passage detection processing by using the figure 601 illustrated in FIG. 6.

Although the present exemplary embodiment has been described by taking the passage detection processing as an example, the present exemplary embodiment is also applicable to the image analysis of other kinds executed by the image capturing apparatus 300. For example, in a case where a figure indicating a region where the moving object detection is to be executed is set onto the corrected image 400, the figure can be converted into a figure used for the moving object detection by the image capturing apparatus 300. Alternatively, in a case where the intrusion detection for detecting an object intruding into a figure specified on the corrected image 400 is to be set thereto, the figure can be converted into a figure used for the intrusion detection by the image capturing apparatus 300.

Figure 1:
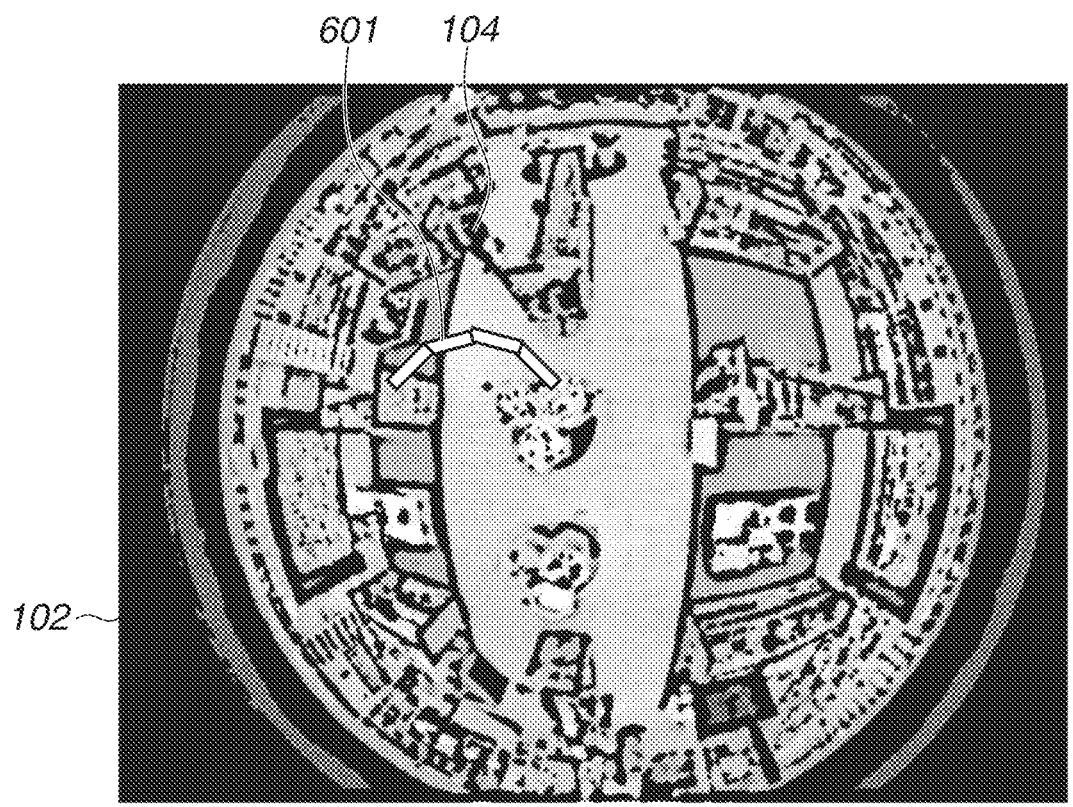
FIG. 1 is a diagram illustrating a state where a passage detection line is set onto a captured image.

After the conversion unit 328 executes the conversion, the transmission/reception unit 321 outputs an instruction for setting the converted figure 601 onto the captured image 102 and executing the image analysis of the captured image 102 by using the converted figure 601 set thereon to the image capturing apparatus 300. FIG. 1 is a diagram illustrating a state where the converted figure 601 is set onto the captured image 102.

As described above, the figure 403 set onto the corrected image 400 can be set to the image capturing apparatus 300 by converting the figure 403 into the figure 601 used for the image analysis by the image capturing apparatus 300.

The control unit 329 controls operations of the constituent elements of the client apparatus 311. For example, a processor such as a CPU may be used as the control unit 329. In a case where the control unit 329 is configured as a processor, for example, the control unit 329 controls the constituent elements of the client apparatus 311 by executing a program stored in a storage unit 330 described below.

The storage unit 330 stores various setting values and data of the client apparatus 311. In a case where the control unit 329 is configured as a processor, the storage unit 330 stores a program executed by the control unit 329. For example, a memory such as a RAM or a ROM may be used as the storage unit 330. Alternatively, a storage medium such as an HDD may be used therefor. Further, the storage unit 330 may be a removable medium such as a flash memory or a memory card.

Figure 10:
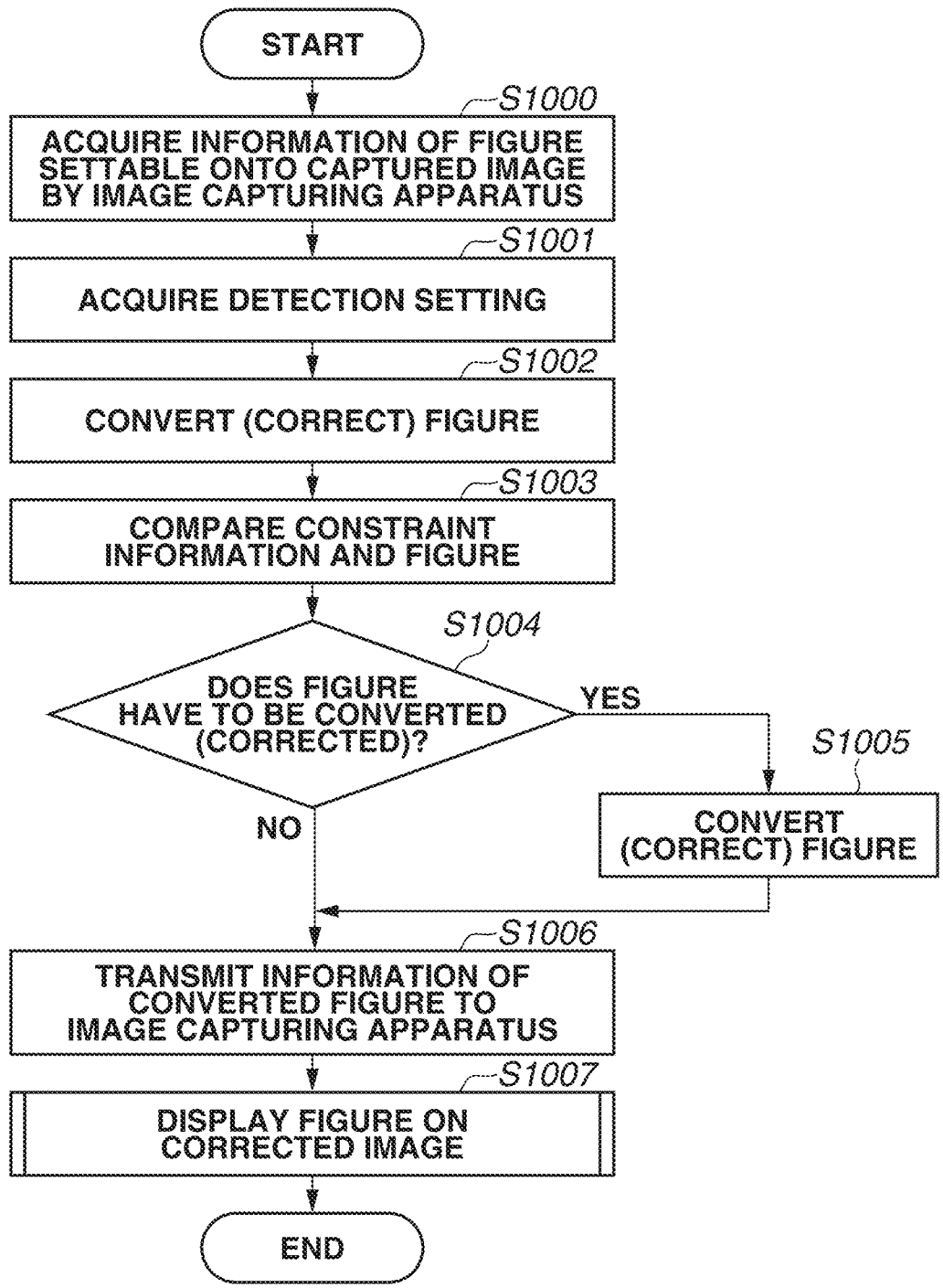
FIG. 10 is a flowchart illustrating processing executed by a client apparatus according to the first exemplary embodiment.

An operation of the client apparatus 311 according to the present exemplary embodiment will be described with reference to FIG. 10. In a configuration where the control unit 329 of the client apparatus 311 includes a processor, the processor functions as a computer. The processing illustrated in FIG. 10 is realized when the processor loads a program stored in the storage unit 330 to execute respective steps illustrated in FIG. 10. Alternatively, all or a part of the processing illustrated in FIG. 10 may be executed by the hardware.

In step S1000, the control unit 329 controls the transmission/reception unit 321 to acquire from the image capturing apparatus 300 the information indicating a figure settable onto the captured image 102 by the image capturing apparatus 300. As described above, for example, the information may be acquired at a timing when the client apparatus 311 is connected to the image capturing apparatus 300. Alternatively, for example, the information may be acquired at a timing when the setting tool for executing detection setting is activated in the client apparatus 311. The acquisition timing thereof is not specified in particular.

In step S1001, the control unit 329 acquires the information relating to a position and a shape of the figure 403 in the corrected image 400 set by the user. The position and the shape of the figure 403 are determined based on the user setting received by the receiving unit 327.

In step S1002, the control unit 329 controls the conversion unit 328 to convert (correct) the shape of the acquired figure 403. In the present exemplary embodiment, the conversion unit 328 corrects the shape of the figure 403 based on the distortion aberration of the lens 301. For example, the figure of the straight line 403 illustrated in FIG. 4 is corrected to the arc-like figure 501 illustrated in FIG. 5.

In step S1003, the control unit 329 compares the information (hereinafter, "constraint information") acquired in step S1000 and the corrected figure 501 corrected in step S1002.

In step S1004, based on a comparison result acquired in step S1003, the control unit 329 determines whether conversion (correction) of the corrected figure 501 is necessary. In a case where the passage detection processing is to be executed, in steps S1003 and S1004, the control unit 329 determines whether the figure 501 corrected in step S1002 satisfies the condition such as a type or the maximum number of the passage detection lines illustrated in the table 701 in FIG. 7.

In a case where the figure 501 corrected in step S1002 does not satisfy the condition indicated by the constraint information (YES in step S1004), the processing proceeds to step S1005. In step S1005, the control unit 329 controls the conversion unit 328 to convert (correct) the figure 501 corrected in step S1002. For example, the figure 501 illustrated in FIG. 5 is converted into the figure 601 illustrated in FIG. 6.

When the processing in step S1005 is to be executed, the conversion unit 328 executes the conversion of two kinds with respect to the image input by the user. In other words, in step S1002, the conversion unit 328 converts the first figure 403 set onto the corrected image 400 into the third figure 501 deformed based on the distortion aberration of the lens 301 of the image capturing apparatus 300. The conversion unit 328 further converts the third figure 501 into the second figure 601 settable onto the captured image 102 by the image capturing apparatus 300.

On the other hand, in a case where the figure 501 corrected in step S1002 satisfies the condition indicated by the constraint information (NO in step S1004), the control unit 329 advances the processing to step S1006 without executing the conversion (correction) of the figure 501.

In step S1006, the control unit 329 controls the transmission/reception unit 321 to transmit the information indicating the figure 601 converted by the conversion unit 328 to the image capturing apparatus 300. The information transmitted to the image capturing apparatus 300 includes information indicating the position of the converted figure 601 in the captured image 102. As described above, the transmission/reception unit 321 transmits an instruction for setting the second figure 601 at a position in the captured image 102 corresponding to the position of the first figure 403 in the corrected image 400 to the image capturing apparatus 300.

As described above, the client apparatus 311 sets the figure used for the image analysis by the image capturing apparatus 300 to the image capturing apparatus 300.

In step S1007, as illustrated in FIG. 4, for example, the control unit 329 displays an image illustrating a state where the figure 403 used for the image analysis is set onto the corrected image 400. In step S1007, an image illustrating a state where the figure used for the image analysis is set onto the captured image 102 (i.e., an image in FIG. 1 or 5) may be displayed.

Figure 11:
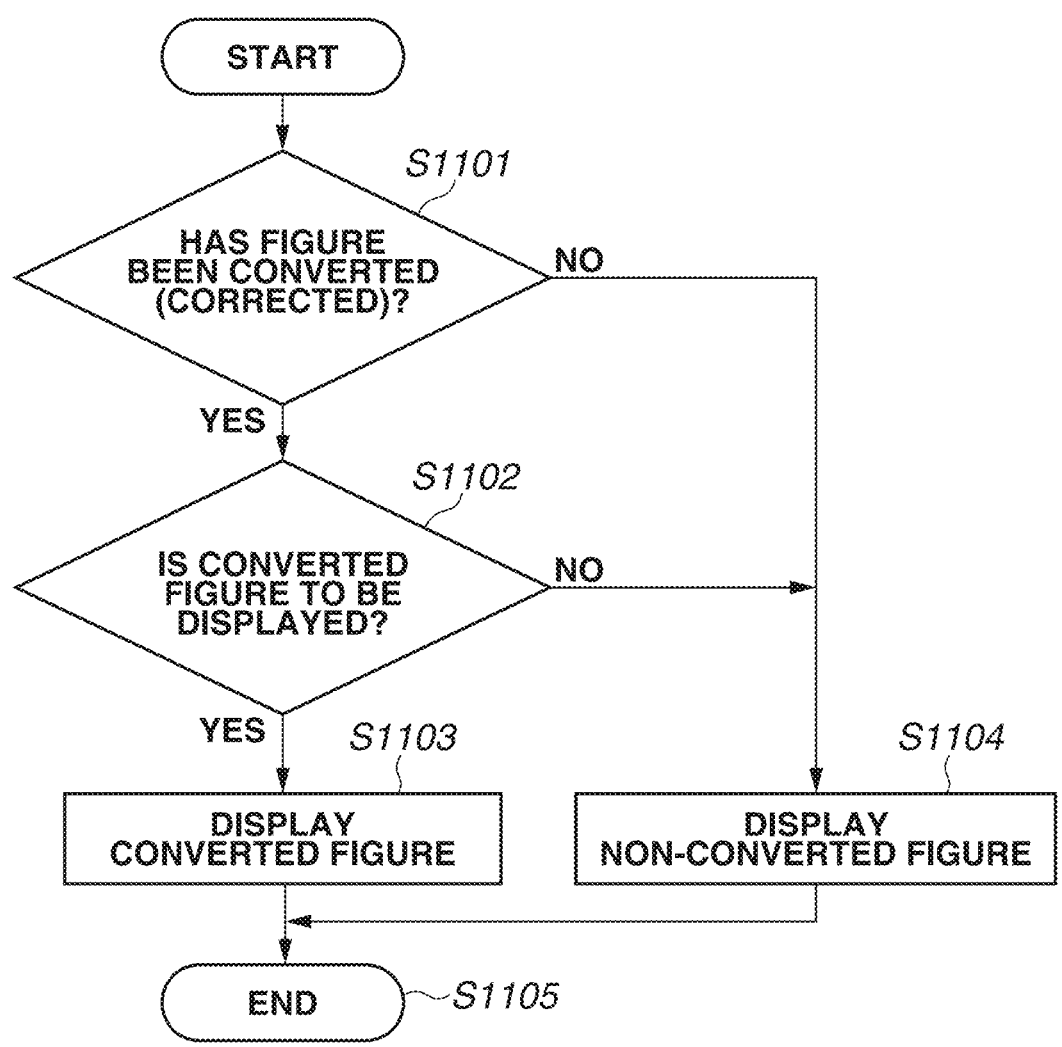
FIG. 11 is a flowchart illustrating display processing of a figure executed by the client apparatus according to the first exemplary embodiment.

The processing in step S1007 will be described in detail with reference to FIG. 11.

In step S1101, the control unit 329 determines whether the processing in step S1005 has been executed. For example, a flag in the storage unit 330 may be set to "ON" when the processing in step S1005 is executed, so that the control unit 329 can determine whether the processing in step S1005 has been executed by determining whether the flag is set to "ON" in step S1101. A determination method is not limited to the above. The control unit 329 may store the determination result of step S1004 and execute the determination in step S1101 based on the determination result of step S1004.

In a case where the processing in step S1005 has not been executed (NO in step S1101), the processing proceeds to step S1104. In step S1104, as illustrated in FIG. 5, a figure that has not been converted based on the constraint information is displayed on the corrected image 400 or the captured image 102. In a case where the figure is to be displayed on the captured image 102, as illustrated in FIG. 5, the figure 501 corrected according to the distortion aberration of the lens 301 of the image capturing apparatus 300 can be displayed thereon.

On the other hand, in a case where the processing in step S1005 has been executed (YES in step S1101), the processing proceeds to step S1102. In step S1102, the control unit 329 determines whether to display the figure that has been converted based on the constraint information or the figure that has not been converted based on the constraint information. For example, the determination in step S1102 can be executed based on the setting executed by the user. As a display for allowing the user to confirm a figure set to the image capturing apparatus 300, the user can previously set whether to display a figure that has not been converted based on the constraint information or a figure that has been converted based on the constraint information to the client apparatus 311.

In step S1102, in a case where the control unit 329 determines that the figure that has not been converted based on the constraint information is to be displayed (NO in step S1102), the processing proceeds to step S1104. In step S1104, the figure that has not been converted based on the constraint information (e.g., figure 501 in FIG. 5) is displayed on the display unit 326. On the other hand, in step S1102, in a case where the control unit 329 determines that the figure that has been converted based on the constraint information is to be displayed (YES in step S1102), the processing proceeds to step S1103. In step S1103, the figure that has been converted based on the constraint information (e.g., figure 601 in FIG. 1) is displayed on the display unit 326.

In addition, in step S1103, both of the figure that has been converted based on the constraint information and the figure that has not been converted based on the constraint information may be displayed. For example, the figure 601 that has been converted based on the constraint information and the figure 501 that has not been converted based on the constraint information may be displayed in different colors, so that the user is allowed to distinguish between the figures 601 and 501. With this configuration, it is possible to clearly notify the user that a figure input to the client apparatus 311 by the user has been converted based on the constraint information of the figure settable to the image capturing apparatus 300.

When the position or the shape of the figure 403 in the corrected image 400 displayed on the display unit 326 is changed, the position or the shape of the figure 501 or 601 in the captured image 102 displayed on the display unit 326 is also changed. Further, in a case where the position or the shape of the figure 501 or 601 in the captured image 102 displayed on the display unit 326 is changed, the position or the shape of the figure 403 in the corrected image 400 displayed on the display unit 326 is also changed.

As described above, according to a change in the display position of one figure from among the first figure 403 displayed on the corrected image 400 and the second figure 601 displayed on the captured image 102, the display position of another figure from among the first figure 403 and the second figure 601 is changed. Further, according to a change in the shape of one figure from among the first figure 403 displayed on the corrected image 400 and the second figure 601 displayed on the captured image 102, the shape of another figure from among the first figure 403 and the second figure 601 is changed.

According to the above-described exemplary embodiment, the user can easily execute a setting of the image analysis on the image capturing apparatus without considering the contents of the image analysis settable to the image capturing apparatus.

Further, in the present exemplary embodiment, a configuration in which the client apparatus 311 converts a figure input thereto by the user according to the figure settable to the image capturing apparatus 300 has been described as an example. However, the configuration is not limited thereto. A function of the conversion unit 328 of the client apparatus 311 may be included in the image capturing apparatus 300. In other words, the image capturing apparatus 300 may acquire information indicating a figure input to the client apparatus 311 and execute conversion of the acquired figure based on the acquired figure and the constraint information of the figure settable by the image capturing apparatus 300.

With the above-described configuration, the user can easily execute the setting of the image analysis on the image capturing apparatus without considering the contents of the image analysis settable to the image capturing apparatus.

In a second exemplary embodiment, description will be given to a configuration in which contents of a constraint condition of the settable figure are different at each region in the captured image 102. The configurations of the image processing system according to the present exemplary embodiment are the same as the configurations described in the first exemplary embodiment, and thus descriptions thereof will be omitted.

In the present exemplary embodiment, a detection region frame will be described as an example of a figure set onto the captured image 102. The detection region frame is used for a setting that makes the image capturing apparatus 300 detect only a moving object existing within the frame. As described in the first exemplary embodiment, a figure to be set onto the captured image 102 may be a passage detection line or a figure used for the intrusion detection.

An example of the constraint condition of the figure settable onto the captured image 102 by the image capturing apparatus 300 according to the present exemplary embodiment will be described with reference to FIG. 12. In the captured image 102 illustrated in FIG. 12, the constraint condition is separately managed with respect to a central region 1201 and a peripheral region 1202 of an image.

Figure 12:
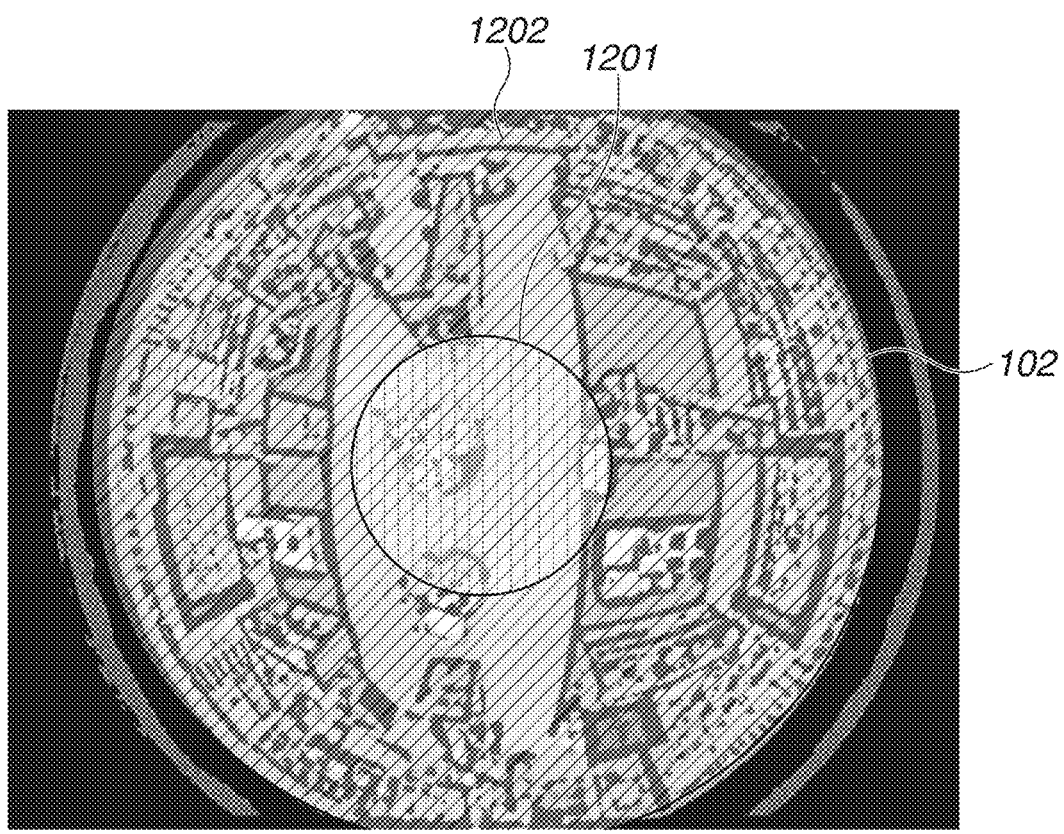
FIG. 12 is a diagram illustrating region division of a captured image according to a second exemplary embodiment.

In the example illustrated in FIG. 12, detection region frames of a first number is settable to the central region 1201, whereas detection region frames of a second number less than the first number is settable to the peripheral region 1202.

Resolution of an image acquired through the lens 301 is relatively higher in the central region 1201 than in the peripheral region 1202. As illustrated in a table 801 in FIG. 8, a number of detection region frames is set to be larger in the region of high resolution and smaller in the region of low resolution, so that the detection region frames can be set thereto efficiently. In other words, although a total number of the detection region frames settable by the image capturing apparatus 300 has an upper limit, detection region frames of a large number can be allocated to the region of better image quality with higher detection accuracy.

The detection region frames are allocated to the respective regions in the captured image 102 in FIG. 12 based on a table 901 illustrated in FIG. 9. Instead of the number of detection region frames, an area settable as a detection region may be allocated thereto. Further, as described above, the maximum number of settable passage detection lines or the maximum number of settable figures used for the intrusion detection may be set at each region in the captured image 102 instead of the above-described detection region frames.

The acquisition unit 323 of the client apparatus 311 acquires the constraint information indicating the constraint condition of the figure settable at each region in the captured image 102 as illustrated in FIG. 9. The constraint information according to the present exemplary embodiment includes information indicating a number of figures or a type thereof settable to a part of the regions in the captured image 102.

The conversion unit 328 of the client apparatus 311 specifies a position where the figure 601 is to be set onto the captured image 102 based on the position where the figure 403 is set onto the corrected image 400 by the user. For example, the conversion unit 328 can specify a setting position of the figure in the captured image 102 based on the distortion aberration of the lens 301.

Then, based on the position specified in the captured image 102 and the constraint information acquired by the acquisition unit 323, the conversion unit 328 determines the constraint condition for converting the figure and executes the conversion (correction) of the figure in step S1005.

The processing to be executed after the conversion is the same as the processing described with reference to FIG. 10 in the first exemplary embodiment, and thus description thereof will be omitted.

As described above, according to the present exemplary embodiment, the user can easily execute the setting of the image analysis on the image capturing apparatus while making the setting thereof conform to the constraint condition of the settable figure set at each of divided regions in the captured image.

As described above, according to the above-described exemplary embodiments, the user can easily execute the setting of the image analysis on the image capturing apparatus without considering the contents of the image analysis settable to the image capturing apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-088797, filed Apr. 23, 2015, which is hereby incorporated by reference herein in its entirety.

What is claimed is:

1. An information processing apparatus that is connected to an image capturing apparatus via a network, the information processing apparatus comprising:
   circuitry configured to:
   (i) acquire, from the image capturing apparatus, an image and constraint information indicating a line or a figure settable onto a captured image with distortion;
   (ii) set a line or a figure, which is input by a user and includes a first number of line segments, onto a corrected captured image generated through distortion correction processing executed on at least a part of the captured image captured by the image capturing apparatus to detect an object, wherein the distortion correction processing corrects the captured image with distortion based on a distortion aberration of a lens of the image capturing apparatus;
   (iii) convert the line or the figure which includes the first number of line segments into a line or a figure, settable to the image capturing apparatus, for a captured image with distortion including a second number of line segments in accordance with the constraint information, the second number being greater than the first number; and
   (iv) transmit, to the image capturing apparatus, information indicating the line or the figure including the second number of line segments.

2. The information processing apparatus according to claim 1, wherein the image capturing apparatus captures the captured image by using the lens which is a fisheye lens.

3. The information processing apparatus according to claim 1, further comprising display control circuitry configured to change one display position of a line or a figure according to a change in another display position of a line or a figure from among any one of:
   (i) a line or a figure set onto the corrected captured image; and
   (ii) a converted line or a converted figure displayed on the captured image.

4. The information processing apparatus according to claim 1, further comprising display control circuitry configured to change one shape of a line or a figure according to a change in another shape of a line or a figure from among any one of:
   (i) a line or a figure set onto the corrected captured image; and
   (ii) a converted line or a converted figure displayed on the captured image.

5. The information processing apparatus according to claim 1, wherein the second number differs depending on an area on the corrected captured image onto which the line or the figure is set.

6. An information processing method for performance by an information processing apparatus that is connected to an image capturing apparatus via a network, the information processing method comprising:

acquiring, from the image capturing apparatus, an image and constraint information indicating a line or a figure settable onto a captured image with distortion;

setting a line or a figure, which is input by a user and includes a first number of line segments, onto a corrected captured image generated through distortion correction processing executed on at least a part of the captured image captured by the image capturing apparatus to detect an object, wherein the distortion correction processing corrects the captured image with distortion based on a distortion aberration of a lens of the image capturing apparatus;

converting the line or the figure which includes the first number of line segments into a line or a figure, settable to the image capturing apparatus, for a captured image with distortion including a second number of line segments in accordance with the constraint information, the second number being greater than the first number; and transmitting, to the image capturing apparatus, information indicating the line or the figure including the second number of line segments.

7. A non-transitory computer readable storage medium storing a program causing an information processing apparatus that is connected to an image capturing apparatus via a network to execute a method, the method comprising:

acquiring, from the image capturing apparatus, an image and constraint information indicating a line or a figure settable onto a captured image with distortion;

setting a line or a figure, which is input by a user and includes a first number of line segments, onto a corrected captured image generated through distortion correction processing executed on at least a part of the captured image captured by the image capturing apparatus to detect an object, wherein the distortion correction processing corrects the captured image with distortion based on a distortion aberration of a lens of the image capturing apparatus;

converting the line or the figure which includes the first number of line segments into a line or a figure, settable to the image capturing apparatus, for a captured image with distortion including a second number of line segments in accordance with the constraint information, the second number being greater than the first number; and transmitting, to the image capturing apparatus, information indicating the line or the figure including the second number of line segments.

* * * * *